(No Model.) 4 Sheets—Sheet 3.
A. MILLER.
EVAPORATING APPARATUS.
No. 410,715. Patented Sept. 10, 1889.
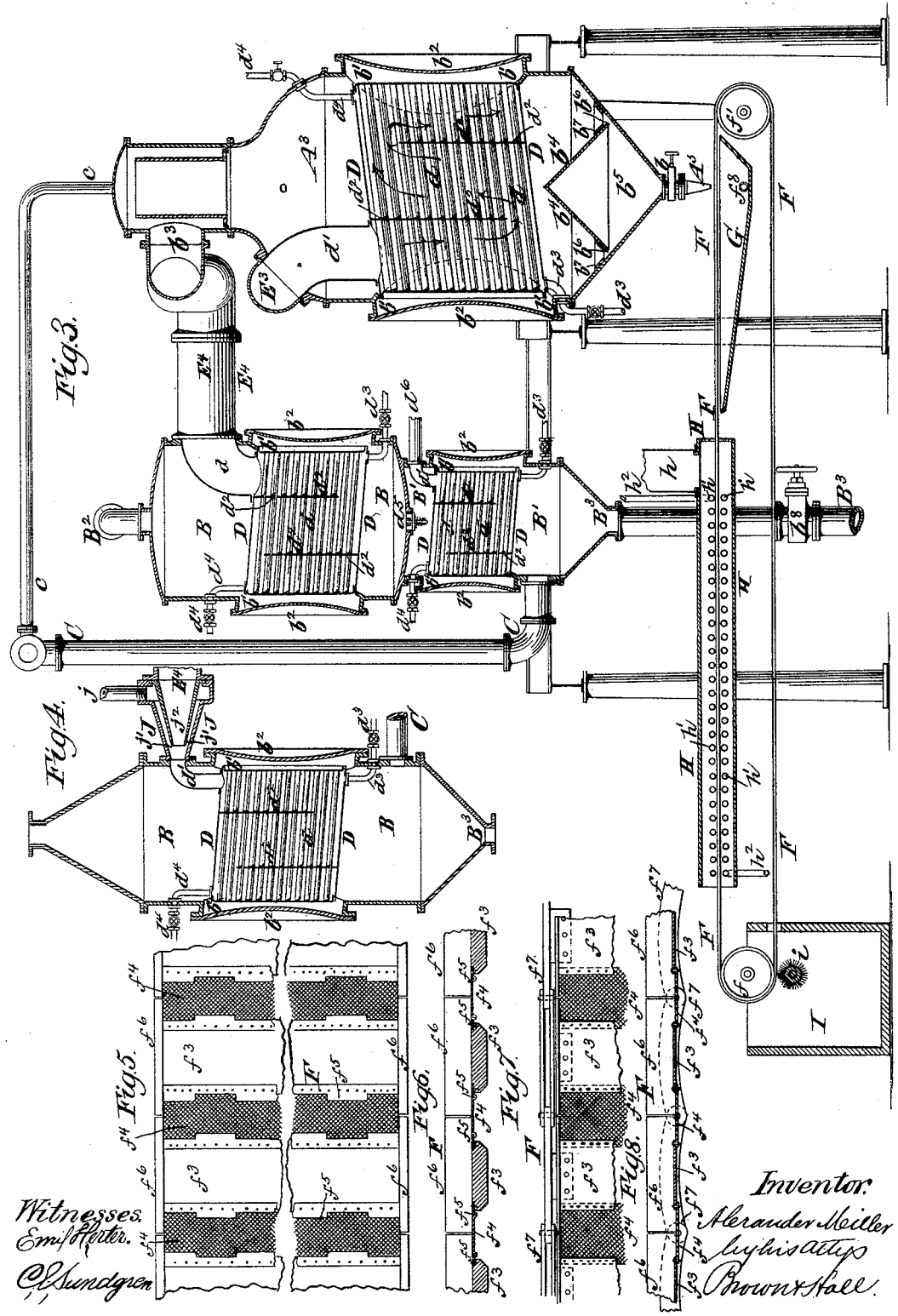

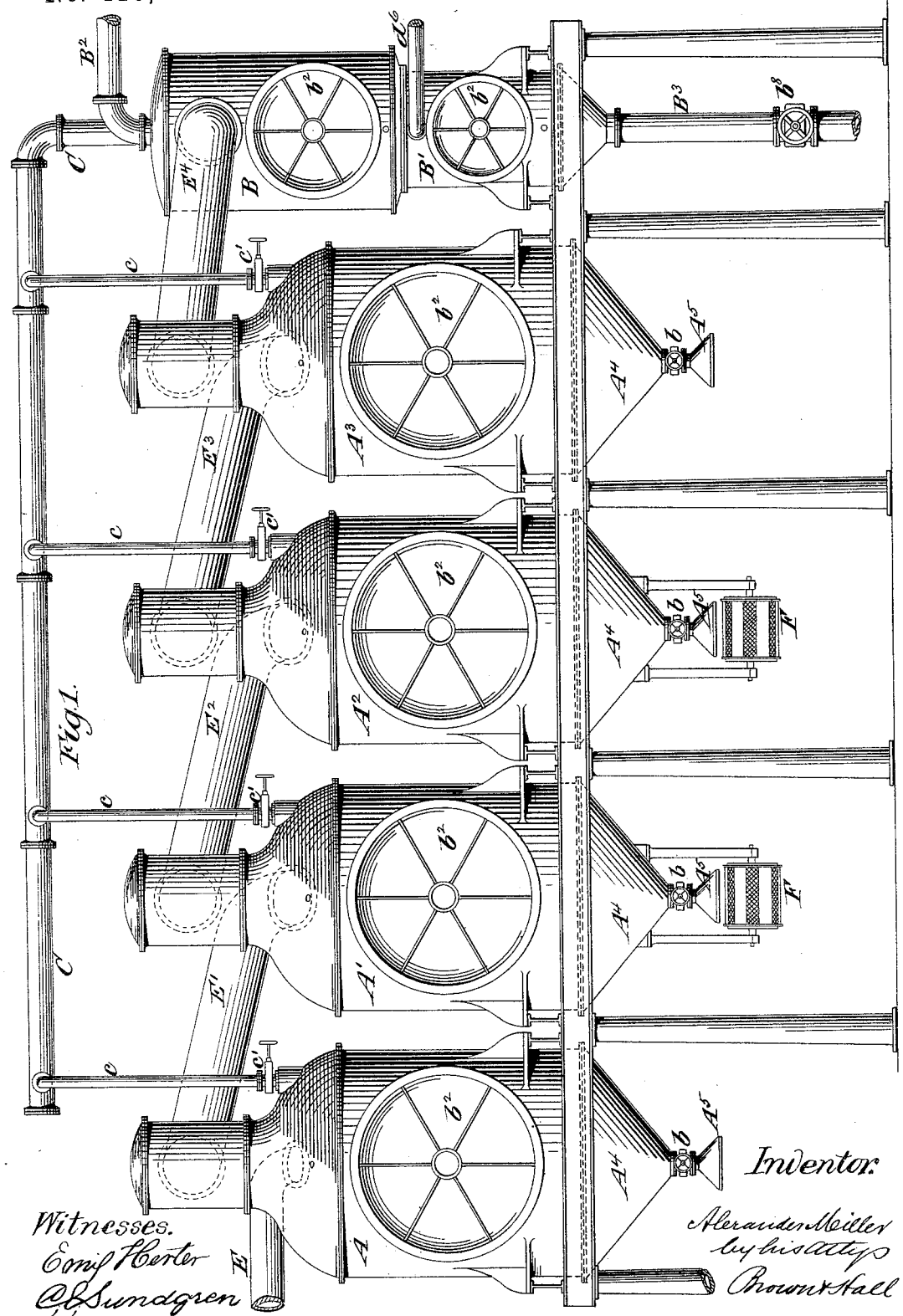

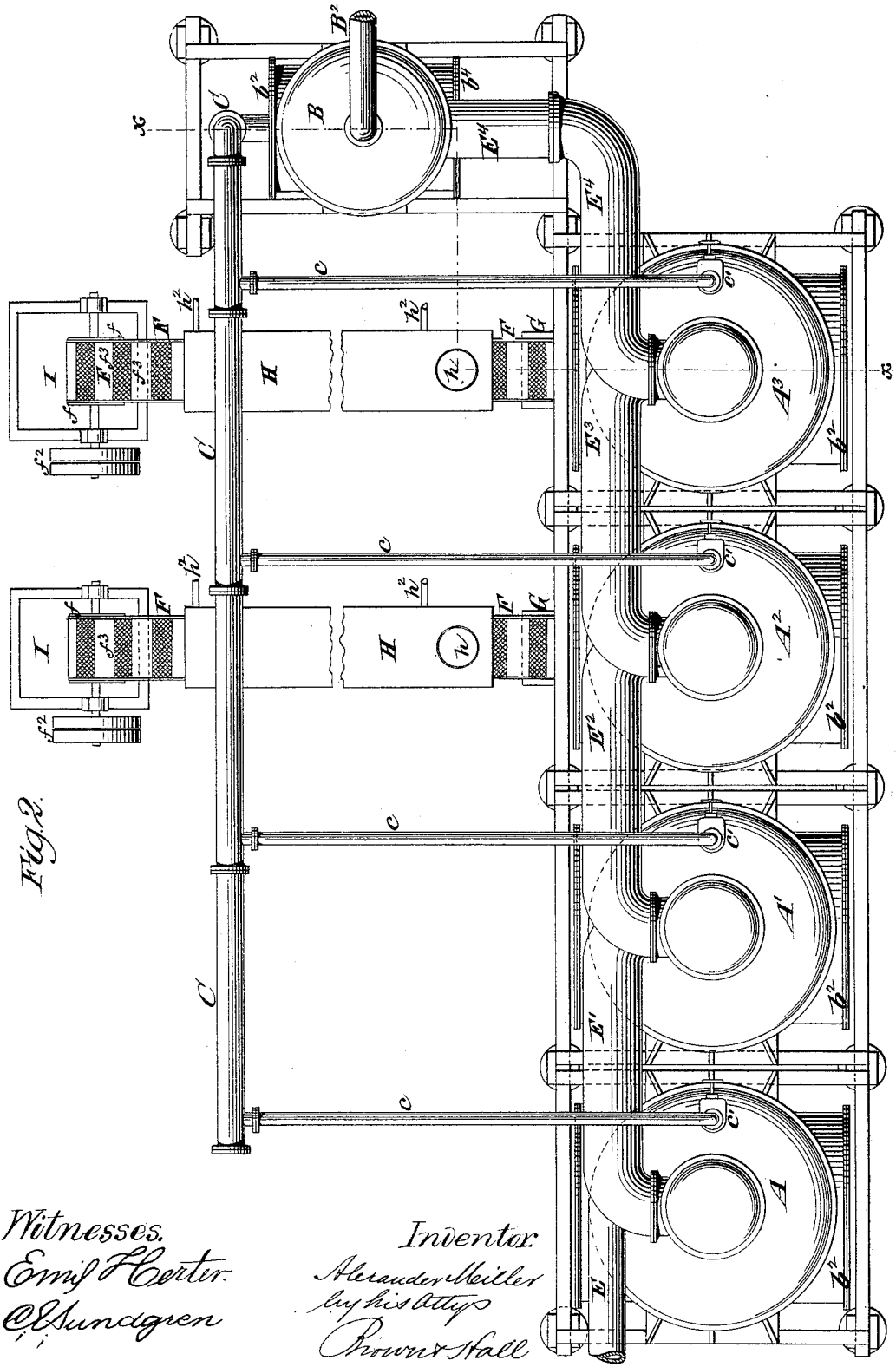

(No Model.) 4 Sheets—Sheet 4.
A. MILLER.
EVAPORATING APPARATUS.
No. 410,715. Patented Sept. 10, 1889.
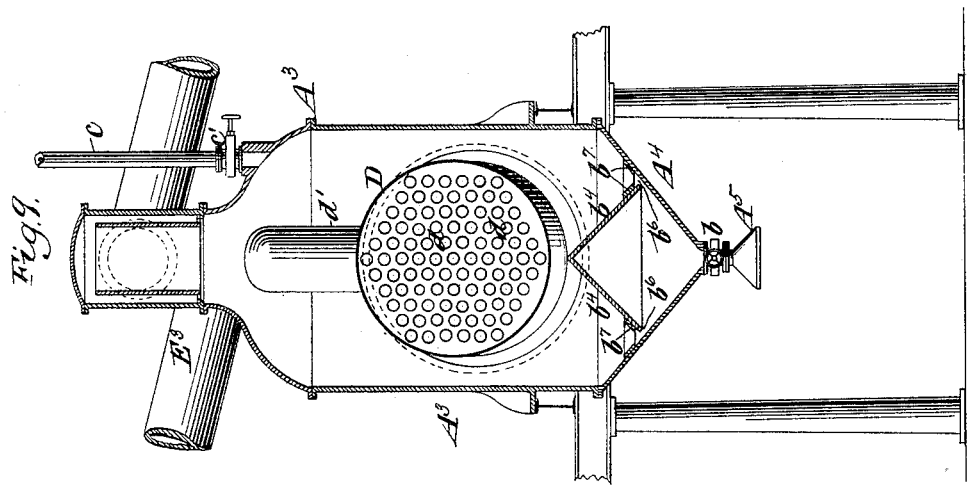

United States Patent Office.

ALEXANDER MILLER, OF NEW YORK, N. Y., ASSIGNOR OF ONE-HALF TO ROBERT DEELEY, OF SAME PLACE.

EVAPORATING APPARATUS.

SPECIFICATION forming part of Letters Patent No. 410,715, dated September 10, 1889.

Application filed February 21, 1887. Renewed July 20, 1888. Serial No. 280,572. (No model.)

*To all whom it may concern:*

Be it known that I, ALEXANDER MILLER, of the city and county of New York, in the State of New York, have invented a new and useful Improvement in Evaporating Apparatus, of which the following is a specification.

My invention relates to evaporating apparatus which is of the same general class as that shown in my Letters Patent No. 357,404, dated February 8, 1887—that is to say, the apparatus in its most complete form comprises a number of upright closed evaporating pans or vessels connected in series for multiple effect, the first pan having its heating-drum supplied with live steam and the last pan having its vapor-outlet communicating with the atmosphere; but certain features of my invention relate to the construction of the individual pans, and may be employed even when a single pan is used for evaporation. The vapor-outlet of the last pan of the series usually communicates with the atmosphere through the heating-drum of a heater, which is preferably constructed in a similar manner to one of the pans, and in which the liquor is raised nearly to a boiling-point by the heat of the vapor emanating from the contents of the last pan. Such an apparatus, although having the advantages resulting from multiple effect, differs from the ordinary sugar-evaporating apparatus in having a pressure maintained in the pans, or in all except the last pan of the series, greater than the atmosphere, instead of having a vacuum maintained in the several pans; and my invention may be employed for producing by evaporation a solid precipitant of any kind which will not be injured by heat due to a pressure of steam much above the atmosphere. The invention, however, is more particularly intended for use in the evaporation of salt.

In the operation of apparatus connected in the manner described, and where the last pan communicates with the atmosphere, there is a loss of heat from each pan to the next pan of the series, due to the heat which is taken off by the precipitant and the loss by radiation; but the heat which is dissipated by both these sources is wholly insignificant as compared to the heat which passes off in vapor from the contents of each pan. As is well known, every pound of vapor carries with it about eleven hundred units of heat, and as for every pound of salt made there must be evaporated about three and one-half pounds of water, it follows that for each pound of salt about three thousand eight hundred and fifty units of heat are carried off in vapor, while the salt itself carries off only about fifty units of heat; hence it will be seen that with closed pans connected in the manner described the greater portion of the heat carried off by the vapor from one pan is utilized for heating the next pan. Inasmuch as there is a slight loss of heat in each pan by radiation and by the heat carried off with the precipitant, it follows that to boil the contents of the last pan of the series under atmospheric pressure steam must be supplied to heat the drum of the first pan of a temperature sufficient to boil the contents of that pan under a pressure considerably above the atmosphere, and the temperature and consequent pressure in the pans of the series will decrease from the first to the second, and so on proportionately to the quantity of heat lost by radiation and carried off with the precipitant.

One object of my invention is to provide a pan of such construction that, while the ebullition throughout the main portion of the body of liquor will be active, the liquor in the lower part of the pan will be kept without violent ebullition and the precipitant be given ample opportunity for depositing in the bottom of the pan.

A further object of my invention is to provide a heater or combination of heaters whereby the brine or other liquor after being preliminarily heated and raised nearly to a boiling-point by the vapors emanating from the contents of the last pan will be subjected to such further heat from steam as is necessary to cause the sulphate of lime and other impurities to deposit before the brine passes to the evaporating pan or pans.

A further object of the invention is to provide for the continuous delivery from an outlet-nozzle at the bottom of each pan of the salt or other precipitant, and for conveying away such precipitant, causing it to drain of brine and also to be dried before it reaches a point of delivery.

The invention consists in novel combinations of parts and features of construction, which are hereinafter described, and pointed out in the claims, whereby the desired objects are attained.

In the accompanying drawings, Figure 1 is an elevation of an apparatus embodying my invention, and comprising four evaporating-pans connected for multiple effect, and two heaters in which the liquor is heated before passing to the pans. Fig. 2 is a plan of the apparatus. Fig. 3 is a sectional elevation upon about the plane indicated by the dotted line $x$ $x$, Fig. 2, showing in section the last evaporating-pan of the series, the two heaters, and the delivery and conveying apparatus of the last pan. Fig. 4 is a sectional elevation of a heater of modified form which I may employ. Figs. 5 and 6 are respectively a plan and longitudinal section of portions of a conveying-apron, one of which may be employed for conveying away the precipitant delivered from each pan. Figs. 7 and 8 are corresponding views of an apron of modified form; and Fig. 9 is a vertical section of one of the pans, $A^3$ for example, in a plane at right angles to the plane of section, Fig. 3.

Similar letters of reference designate corresponding parts in all the figures.

A $A'$ $A^2$ $A^3$ designate a series of pans or closed vessels, here shown as four in number, and which are connected for multiple effect, as I shall soon describe. These may be of cast-iron or other metal, and have conical or inverted bottoms $A^4$, from each of which leads an outlet-nozzle $A^5$, provided with a suitable valve or gate $b$. I have also shown connected with the series of pans a double heater or two heaters B B', the internal construction of which is shown in Fig. 3. Brine or other liquor may be supplied to the several pans A $A'$ $A^2$ $A^3$ through branch pipes $c$, leading from a main pipe C, and provided each with a valve $c'$, and the supply may be either continuous or interrupted.

Turning now to Fig. 3, it will be observed that in the pan (and all the pans may be constructed similarly) is a heating-drum D, which is cylindric and has its axis extending transversely across the pan. The drum contains and is filled with tubes $d$, which extend parallel with its axis across the pan, and both the drum D and its tubes $d$ are inclined to the horizontal. In the side and, in this example of my invention, in each side of the pan is an opening $b'$, which is as large or larger than the drum D, and which is closed by a removable door or cover $b^2$. It will therefore be seen that when the doors or covers $b^2$ are removed ready access may be had to the tubes $d$ of the heating-drum for cleaning them by means of a flue-brush, and the drum itself may, if desired, be removed through such opening.

$d'$ designates the vapor-pipe through which vapor passing from the vapor-outlet $b^3$ of one pan is conducted to the interior of the heating-drum D of the next pan, and such vapor circulating through the heating-drum D and around the tubes $d$ is condensed and transmits its heat through the tubes. The arrangement of the drums D in a position inclined to the horizontal causes a very rapid circulation of liquor through the tubes from the lower to the upper ends thereof, and inasmuch as the diameter of the pan $A^3$ is considerably greater than the diameter of the drum D arranged therein, ample space is afforded at the sides of the drum for circulation past it from the upper to the lower portions of the pan.

For increasing the effect of the vapors entering through the inlet $d'$, I have represented in the drum D diaphragms $d^2$, the first of which extends from the top of the drum nearly to the bottom thereof, and the second of which extends from the bottom nearly to the top thereof. These diaphragms cause the entering vapors to take a course indicated by the arrows in Fig. 3 and to make contact with the entire surface of the heating-tubes $d$.

In Figs. 1 and 2, E designates the steam-inlet pipe, whereby steam from an outside source is delivered to heat the drum D of the first pan A; and E' $E^2$ $E^3$ designate pipes or connections whereby the vapors emanating from the contents of each pan of the series are conducted from the vapor-outlet $b^3$ of that pan to the vapor-inlet $d'$, communicating with the drum of the next pan.

Turning again to Fig. 3, it will be seen that the heating-drum D of each pan has a drip-pipe $d^3$ leading from its bottom at the lower end, and through which water of condensation may be delivered, and an air-vent pipe $d^4$ leading from its top at the upper end, and through which any air carried into the drum with the vapors will escape, these pipes being both provided with suitable valves. The heat of the vapors in the drum D will produce an active circulation through the tubes $d$ of the drum and the violent ebullition of the brine or other liquor in the pan, and the main body of the liquor will be in such violent ebullition as to prevent the proper deposit of the salt or other precipitant. To provide for such deposit of precipitant, I have shown in the lower part of the pan a partition $b^4$, whereby there is formed in the lower part of the pan a substantially separate compartment $b^5$, which communicates with the portion of the pan above the partition $b^4$ only by a restricted opening $b^6$. In this example of my invention the partition $b^4$ is of conical form, and the restricted opening $b^6$ is afforded around its entire edge, and the conical partition is supported by the frame $b^7$ within the pan. While the body of liquor above the conical partition $b^4$ will be in active state of ebullition the liquor in the compartment $b^5$ below such partition will be in a state of comparative quiescence, and therefore ample opportunity will be afforded for the deposit of salt or other precipitant in the bottom of the pan below the conical partition $b^4$.

From the vapor-outlet $b^3$ of the last pan of the series $A^3$ the vapors escape through a pipe $E^4$. This pipe does not communicate directly with the atmosphere, but with a heating-drum D, arranged in the first heater B. The casing of the first heater B has at opposite sides openings $b'$, closed by doors or covers $b^2$, and the drum D, which is arranged in an inclined position opposite these openings $b'$, contains inclined heating-tubes $d$ and diaphragms $d^2$, and the pipe $E^4$, from the vapor-outlet $b^3$ of the last pan of the series, connects directly with the vapor-inlet $d'$, leading to the heating-drum D. In this example of the invention, therefore, the heating-drum D and its appurtenances within the heater B are substantially similar to those arranged within the several pans A $A'$ $A^2$ $A^3$, and the heating-drum D in the heater has a drip $d^3$ for water of condensation, and the air-vent $d^4$, similar to the several pans.

It will therefore be seen that through the heating-drum D of the first heater B the vapor-outlet $b^3$ of the last pan $A^3$ of the series communicates with the atmosphere, and the quantity and temperature of steam admitted through the inlet E to the heating-drum D of the first pan of the series should be such that the vapor passing from the last pan $A^3$ to the heating-drum of the heater B will be sufficient to raise the brine or other liquor in the heater B nearly or quite to the boiling-point. If desired, an air-pump might be connected with the air-vent $d^4$ of the heating-drum D in the first heater B, and by such pump the air may be exhausted from the drum and a partial vacuum maintained therein, thus increasing the range of temperature from the first pan to the last pan of the series. In this example of my invention the second heater B' is formed in the same integral structure as the heater B, and they communicate through a self-closing valve $d^5$, opening outward or downward from the heater B. Brine or other liquor may be pumped into the heater B through an inlet-pipe $B^2$, and is delivered from the heater B' through the pipe C to the several pans, as before described. The body of the heater B' has in opposite sides openings $b'$, closed by doors $b^2$, and opposite these openings is an inclined heating-drum D, containing heating-tubes $d$ and diaphragms $d^2$, the drum and its arrangement in the heater B' being in this example of my invention similar to the drums D of the several pans and the heater B. The drum D in the heater B' may have drip and vent pipes $d^3$ $d^4$, as before described, and to it is supplied live steam through a pipe $d^6$. The two heaters B B' may be maintained full of brine or other liquor, and after the liquor is preliminarily heated in the heater B, or, in other words, after it has absorbed in said heater all the heat of the vapors emanating from the last pan $A^3$, the liquor is raised in the heater B' to a very much higher temperature, which is sufficient to cause it to deposit in said heater B' the sulphate of lime and other impurities and avoid the presence of such impurities in the evaporating-pans either wholly or to a great degree. The heater B' has a discharge or outlet pipe $B^3$, which is provided with a gate or valve $b^8$, and which affords provision for blowing off the impurities from the heater. Although the brine or liquor in the heater B' is raised to a temperature much above the boiling-point, vapor will not be generated therefrom, because the heater is filled with liquor. This superheating of the liquor without permitting the generation of steam therefrom does not, however, result in any loss of heat, because as soon as the liquor passes into the evaporating-pans its pressure is at once reduced and an amount of vapor proportionate to the temperature of the liquor is instantly generated from the liquor.

Beneath the outlet-nozzle $A^5$ of each pan is arranged a conveyer whereby the salt or other precipitant is conveyed away, and is preferably in its transit allowed to drain and then also to dry.

In Figs. 1 and 2 I have shown two of the pans only as provided with conveyers F in order to reduce the amount of drawing; but it will be understood that there is a similar conveyer for each evaporating-pan. The conveyer here represented consists of an endless belt or apron, which passes around rollers or cylinders $f f'$, and which may be moved by a belt running over pulleys $f^2$ upon a shaft of one of the rollers $f$. This apron or conveyer F may be of any suitable character which will cause it to hold and carry the salt or other precipitant to the desired point, and also provide for the drainage from the precipitant of the small quantity of brine or liquor delivered with it.

I have in Figs. 5 to 8 represented two constructions of the apron which may be employed for the purpose. The apron shown in Figs. 5 and 6 is composed of alternate sections $f^3 f^4$, the sections $f^3$ being of wood or other material and imperforate, and the sections $f^4$ being of wire-gauze, perforated metal, or other reticulated or foraminous material. The liquor drains off from such portions of the precipitant as are supported on the imperforate portions of the apron $f^3$, and the brine passes through the apron and into a receptacle from which it can be conveyed in order that it can be again introduced into the evaporating-pans. The imperforate and perforate sections $f^3 f^4$ of the aprons shown in Figs. 5 and 6 may be hinged together at $f^5$, so as to readily pass upon the drums or rollers $f f'$, and the apron may have at the sides flanges $f^6$, which prevent the flow of brine and the precipitant over the edges of the apron and confine the precipitant between the sides of the apron.

In Figs. 7 and 8 I have represented an apron composed of alternate sections $f^3$ of imperforate material and intermediate sections $f^4$ of wire-gauze, perforated metal, or other suitable material. In this example of my invention the apron is flexible in the direction of its length, and is provided with flanges $f^6$, as before described, and this apron is secured to endless chains $f^7$, whereby it is carried and through which motion is transmitted to it. In its upper travel the apron or conveyer F supports the precipitant, and near the receiving point or nozzle $A^5$, I have represented a drainage-box G, which may have a suitable outlet $f^8$ for liquor. By the time the precipitant supported on the apron F has passed the drainage-box G the major proportion of the brine or liquor has been freed from the precipitant by drainage, and in its later travel the conveyer or apron F passes through a drying-chamber or heating-box H, which is provided with a suitable outlet pipe or flue $h$ for vapors.

Within the drying-chamber or heating-box H are arranged steam-coils $h'$, which may be supplied with steam by pipes $h^2$, and which are arranged immediately under or both immediately under and over the conveyer or apron F in its upper travel. By these means the salt or other precipitant is materially dried in its travel upon the apron or conveyer F and finally deposited in the box I, the precipitant being removed from the apron or conveyer by a brush $i$ or otherwise.

The construction of the endless sifting or straining aprons of alternating imperforated and perforated or reticulated sections, as hereinabove described, is an improved feature of my invention. The imperforated sections carry, strengthen, and sustain the perforated or reticulated sections; but beyond this there is another advantage. Some salt is unavoidably lost on a perforated apron by escaping through the perforations; but there is less loss in an apron having alternating perforated and imperforated sections, though such an apron enables the straining or draining to be performed as effectively as upon an apron which is perforated throughout its whole length, because while the salt which falls upon the imperforated portion is drained thereon and the liquor drained from it escapes through the perforated portions none of the salt which falls upon the imperforated portion is lost.

It will be observed that the outlet-nozzle $A^5$ from each pan is very narrow or has small dimension in a direction lengthwise of the conveyer or apron F, and in its other dimension is only as wide as the conveyer, apron, or belt F, as is shown in Fig. 3.

Instead of a double heater or two heaters B B', as shown in Figs. 3 and 1, I may employ a single heater of the construction shown in Fig. 4. This heater B is in its internal construction and as regards the heating-drum D in all respects like the heater B shown in Figs. 1 and 3, and the same letters of reference apply thereto. At the bottom of this heater is an outlet $B^3$, through which the sulphate of lime or other impurities may be removed. The vapor-outlet $b^3$ from the last pan $A^3$ of the series communicates by a pipe $E^4$ with the vapor-inlet $d'$ of the heater-drum D. (Shown in Fig. 4.) In connection with this heater I also employ an injector J, (shown in Fig. 4,) having a pipe $j$, through which live steam is admitted, and the flow of live steam through the pipe $j$ and the space $j'$ around the vapor-nozzle $j^2$ induces a flow of vapor, and the live steam, mingled with the vapor from the last evaporating-pan, passes into the drum D of the heater B and raises the temperature of the brine or other liquor therein very much higher than would be the case if there were used in the said heating-chamber only the vapors from the last pan of the series. The live steam which is added by this injector serves to heat the brine or liquor in the heater B (shown in Fig. 4) to such a degree that the sulphate of lime and other impurities will deposit therein.

I am aware that it is not new to arrange within a closed evaporating-pan a heating-drum having a transverse axis, and do not claim such a feature, broadly, as of my invention. I am also aware that it is not new to purify brine before conducting it to an evaporating-pan, and I only seek to cover the particular combination of parts whereby I accomplish that result. I am also aware that in connection with a number of evaporating-pans a trough and screw conveyer have been employed for conducting mixed salt and brine to a series of centrifugal machines, and that a similar trough and screw conveyer have been used for conducting the dried salt from the centrifugal drier. I am also aware that in combination with the ordinary salt-evaporating pans an apron not having reticulated or perforated portions has been used for conveying salt to the ends of the pan, and that a similar but transverse apron has been used to convey salt to a place of delivery. I do not claim any of these features, broadly, as of my invention, but only seek to cover the combinations of parts by me shown and described. The sieving-aprons form a legitimate combination with the pans having outlets at the bottoms, because they provide for removing precipitant at any time during the operation without stopping the operation, and for draining the salt or precipitant during transit from the pan.

What I claim as my invention, and desire to secure by Letters Patent, is—

1. The combination, with an upright closed evaporating-pan and a heating-drum arranged therein and containing tubes for circulation of liquor, of a partition arranged in the pan and forming below it in the lower part of the pan a compartment which communicates with the portion of the pan above the partition only through a restricted but uninterrupted and constantly-open aperture in the partition, whereby violent ebullition below the partition will be prevented and the precipitant allowed to deposit, substantially as herein described.

2. The combination, with an upright closed evaporating-pan and a heating-drum arranged therein and containing tubes for circulation, of the conical hood or partition $b^4$, extending nearly across the pan, and affording between its edges and the wall of the pan a restricted opening $b^6$, substantially as herein described.

3. The combination, with an evaporating-pan, as $A^3$, and a heating-drum arranged therein and containing tubes for circulation, of two heaters B B', connected for the passage of liquor from one to the other of them, and each provided with a heating-drum containing tubes for circulation, a pipe $E^4$, connecting the vapor-outlet of the pan with the heating-drum of the heater B, and a pipe $d^6$, for supplying the heating-drum of the heater B' with steam, a pipe $B^2$, for feeding the first heater with liquor, and a pipe C, for conducting hot liquor from the second heater to the pan, substantially as herein described.

4. The combination, with an upright closed evaporating-pan $A^3$ and a heating-drum arranged therein and containing tubes for circulation, of the heater B' and tubes $d$ therein for circulation, the said heater having its liquor-inlet at the top and its liquor-outlet near the bottom, and being provided at the bottom with an outlet $B^3$, furnished with a valve or gate, and serving for the removal of impurities from the heater while the apparatus is in operation, substantially as herein described.

5. The combination, with an evaporating-pan $A^3$, and a heating-drum arranged therein and containing tubes for circulation, of the two heaters B B', arranged one above the other and having a communicating opening controlled by a valve $d^5$, feed and delivery pipes $B^2$ C for the liquor, heating-drums containing tubes for circulation and arranged in the heaters, a pipe connecting the vapor-outlet of the pan with the drum of the first heater B, and the pipe for supplying steam to the drum of the second heater B', substantially as herein described.

6. The combination, with an upright evaporating-pan having at the bottom an outlet-nozzle $A^5$, and the heating-drum arranged in the pan, of an endless conveying and sieving or straining apron arranged below the outlet-nozzle and receiving precipitant therefrom, the nozzle being contracted in a direction lengthwise of the apron and having a width nearly equal the width of the apron, substantially as herein described.

7. The endless sieving or straining apron herein described, composed of alternate imperforate and perforated or reticulated sections and having flanges at the sides, substantially as herein set forth.

8. The combination, with an endless conveying and sieving or straining apron for receiving precipitant, of a drainage-box arranged beneath the apron in its upper travel and near the receiving end, and a heated drying-chamber, through which the apron passes after passing the drainage-box, substantially as herein described.

ALEX. MILLER.

Witnesses:
FREDK. HAYNES,
HENRY J. MCBRIDE.